United States Patent [19]

Saio et al.

[11] Patent Number: 5,801,355
[45] Date of Patent: Sep. 1, 1998

[54] PLASMA PIERCING WITH NON-OXIDATIVE PLASMA GAS AND PLASMA CUTTING WITH OXIDATIVE PLASMA GAS

[75] Inventors: Katsuo Saio, Ninomiya-machi; Masahiko Hasegawa, Hiratsuka, both of Japan

[73] Assignee: Komatsu Ltd., Tokyo, Japan

[21] Appl. No.: 750,033

[22] PCT Filed: May 23, 1995

[86] PCT No.: PCT/JP95/00979

§ 371 Date: Nov. 25, 1996

§ 102(e) Date: Nov. 25, 1996

[87] PCT Pub. No.: WO95/32072

PCT Pub. Date: Nov. 30, 1995

[30] Foreign Application Priority Data

May 25, 1994 [JP] Japan .................. 6-135169

[51] Int. Cl.[6] ......................... B23K 10/00
[52] U.S. Cl. ................. 219/121.44; 219/121.39; 219/121.55
[58] Field of Search ............. 219/121.39, 121.44, 219/121.59, 75, 74, 121.51, 121.54, 121.56, 121.55

[56] References Cited

U.S. PATENT DOCUMENTS

| 5,214,263 | 5/1993 | Sakuragi .................. 219/121.5 |
| 5,591,357 | 1/1997 | Couch, Jr. et al. .......... 219/121.39 |
| 5,614,110 | 3/1997 | Shintani et al. ............ 219/121.44 |

FOREIGN PATENT DOCUMENTS

| 35-7259 | 6/1960 | Japan . |
| 51-135858 | 11/1976 | Japan . |
| 1-9112 | 2/1989 | Japan . |
| 2-63693 | 3/1990 | Japan . |
| 6226451 | 8/1994 | Japan .................. 219/121.44 |

Primary Examiner—Mark H. Paschall
Attorney, Agent, or Firm—Sidley & Austin

[57] ABSTRACT

The invention provides a method and an apparatus for plasma cutting which can produce a cut product having less dross, affixed thereto, and a clear cut surface, and which are capable of high-speed performance even at the time of the piercing operation. To this end, during the time of the piercing operation, an oxidative gas ($O_2$) is used as the plasma gas, and at the time of the cutting operation a non-oxidative gas ($N_2$) is used as the plasma gas to cut a workpiece (6). In addition, when shifting from the piercing operation to the cutting operation, the supplying of the non-oxidative gas ($N_2$) can be started before the supplying of the oxidative gas ($O_2$) is stopped.

17 Claims, 2 Drawing Sheets

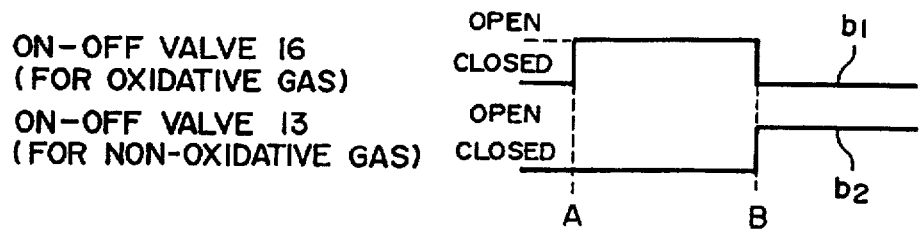
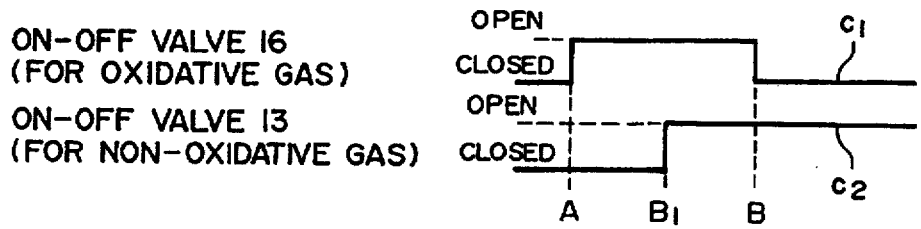
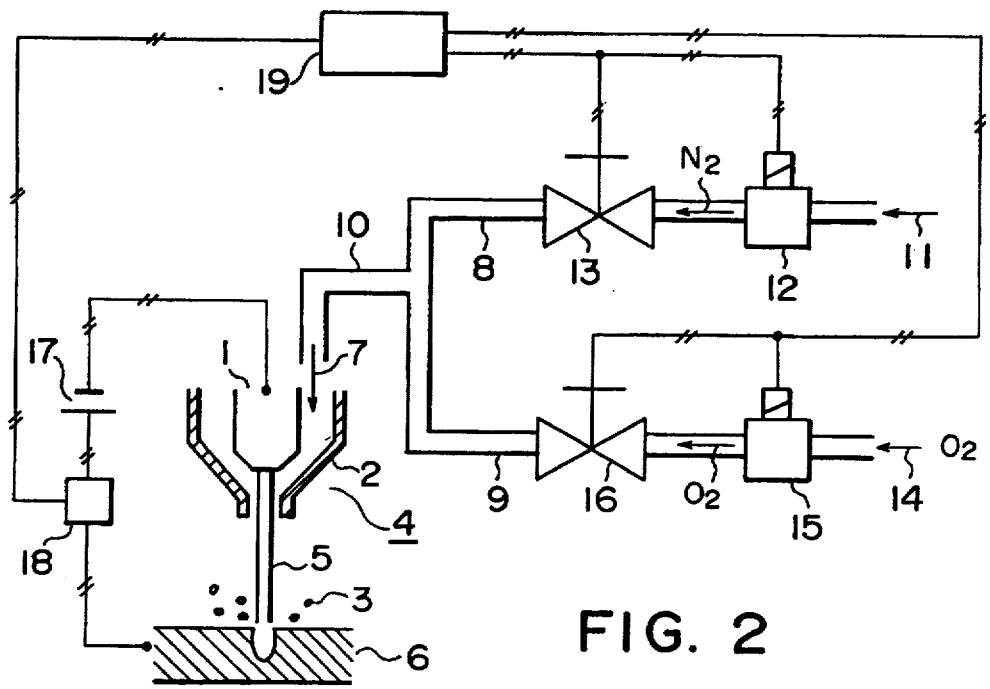

PLASMA PIERCING WITH NON-OXIDATIVE PLASMA GAS AND PLASMA CUTTING WITH OXIDATIVE PLASMA GAS

TECHNICAL FIELD

The present invention relates to a method and an apparatus for plasma cutting which are employed to cut a workpiece with a plasma gas.

BACKGROUND ART

In a method and an apparatus for plasma cutting heretofore known, a workpiece is cut by using a non-oxidative gas as the plasma gas. When a workpiece is, e.g., stainless steel or an aluminum alloy, a non-oxidative gas, e.g., nitrogen gas, argon gas, hydrogen gas, or methane gas, is used as the plasma gas. By using a non-oxidative gas, a cut product can have less dross, affixed thereto, and a clear cut surface.

Also, when an electrode is made of a metal, e.g., tungsten, that lowers its melting point and is quickly consumed when oxidized, a non-oxidative gas is used as the plasma gas, as mentioned above. By using a non-oxidative gas, it is possible to prevent oxidation of the electrode and early consumption of the electrode.

The piercing start in the prior art will be described. When cutting a workpiece 6 to produce a cut product 62, circumscribed by b-c-d-e-b, for example, as shown in FIG. 4, if the cutting operation is started from the point b, a hole bored at the point k has a larger diameter and blown-up dross affixes thereto in an increased amount, resulting in an inability to maintain the cutting quality. For this reason, the piercing start is practiced as a method of first forming a through-hole (piercing hole) 61 at a point a near the point b by boring (piercing), and then cutting the workpiece 6 from the through-hole 61 along b-c-d-e-b-f in the order named, thereby producing the cut product 62 with high cutting quality. Generally, when the workpiece 6 is a thin plate, the piercing is made by a plasma arc, but when the workpiece 6 is a thick plate, it is pierced beforehand by drilling.

In the prior art plasma cutting method of cutting a workpiece with a non-oxidative gas, it is sure, as stated above, that the cutting operation is performed with a smaller amount of dross affixed, a clean cut surface, and less consumption of the electrode. At the piercing start, however, because the plasma gas contains no oxygen gas, $O_2$, the heat of oxidation reaction cannot be utilized, giving rise to a problem in that the piercing time is prolonged. This problem is significant, particularly when the workpiece is a thick plate or is made of stainless steel. Further, the prolonged piercing time increases the chance that blown-up dross affixes to the plasma torch. Thus, the plasma torch generates a double arc, due to the dross affixed thereto, and the life time of the plasma torch is shortened.

BRIEF SUMMARY OF THE INVENTION

The present invention has been accomplished with a view of solving the above-stated problems in the prior art, and its object is to provide a method and an apparatus for plasma cutting which can produce a cut product having less dross, affixed thereto, and a clear cut surface, which can reduce consumption of an electrode, and which are capable of high-speed performance even at the time of the piercing operation.

The present invention provides a method for plasma cutting with which a workpiece is cut by ejecting a plasma arc from a nozzle while plasma gas is supplied around an electrode, wherein an oxidative gas is supplied as the plasma gas at the time of a piercing operation, and the composition of the plasma gas is changed to a non-oxidative gas when shifting from the piercing operation to a cutting operation, thereby cutting the workpiece by the non-oxidative gas. The oxidative gas can be oxygen gas or a gas containing oxygen gas, and the non-oxidative gas can be a gas containing at least one of nitrogen gas, argon gas, hydrogen gas, and methane gas. Further, when shifting from the piercing operation to the cutting operation, the supplying of the non-oxidative gas can be started before the supplying of the oxidative gas is stopped.

With the arrangements set forth above, the composition of the plasma gas can be selected to be optimum for the piercing operation and the cutting operation in consideration of material properties of the electrode and the material to be cut; therefore, more suitable cutting conditions can be selected. For example, when an oxidative gas is used as the plasma gas at the time of the piercing operation, the heat of the oxidation reaction can be utilized for the piercing operation. This enables the piercing time to be reduced. Also, by starting the supplying of the non-oxidative gas before shifting to the cutting operation, variations in the gas pressure during the shifting can be suppressed, and hence the plasma arc is stabilized.

The present invention also provides an apparatus for plasma cutting comprising plasma gas supply means for supplying plasma gas around an electrode, and a nozzle for ejecting the plasma gas as a plasma arc, the plasma arc cutting a workpiece, wherein the plasma gas supply means comprises a first plasma gas supply means for supplying an oxidative gas at the time of a piercing operation, a second plasma gas supply means for supplying a non-oxidative gas at the time of a cutting operation, and switching means for switching the first plasma gas supply means and the second plasma gas supply means, to be selected respectively at the time of the piercing operation and at the time of the cutting operation. The switching means can be set such that, when shifting from a piercing operation to a cutting operation, the supplying of the non-oxidative gas is started before the supplying of the oxidative gas is stopped.

With the arrangements set forth above, as with the above method for plasma cutting according to the present invention, more suitable cutting conditions can be selected. Further, when an oxidative gas is used as the plasma gas at the time of a piercing operation, the heat of oxidation reaction can be utilized; therefore, the piercing time can be reduced. In addition, by setting the switching means as mentioned above, variations in gas pressure during the shifting can be suppressed, and hence the plasma arc is stabilized.

BRIEF DESCRIPTION OF THE DRAWINGS

FIG. 1 is a time chart for an embodiment of the present invention; that is, (a) shows a plasma activating command common to the first and second embodiments, (b) represents the first embodiment in which; (b1) shows operation of an on-off valve for an oxidative gas and (b2) shows operation of an on-off valve for a non-oxidative gas, and (c) represents the second embodiment in which; (c1) shows operation of an on-off valve for an oxidative gas and (c2) shows operation of an on-off valve for a non-oxidative gas, FIG. 2 is a block diagram for explaining a plasma cutting apparatus according to an embodiment.

BEST MODE FOR CARRYING OUT THE INVENTION

Figure 3:
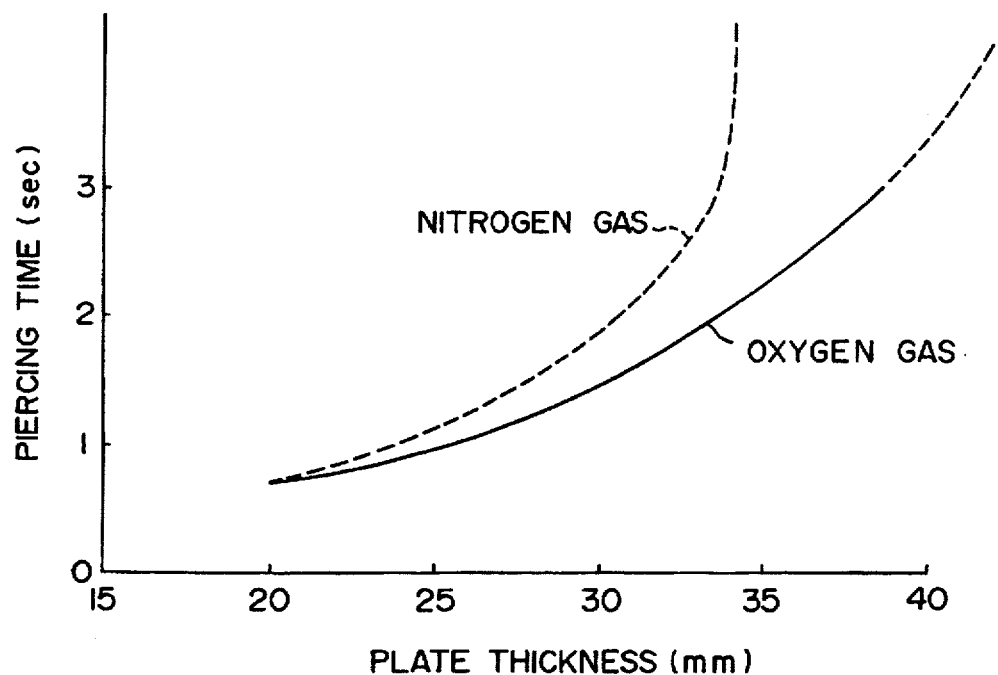
FIG. 3 is a graph showing test results obtained with the first embodiment.
Figure 4:
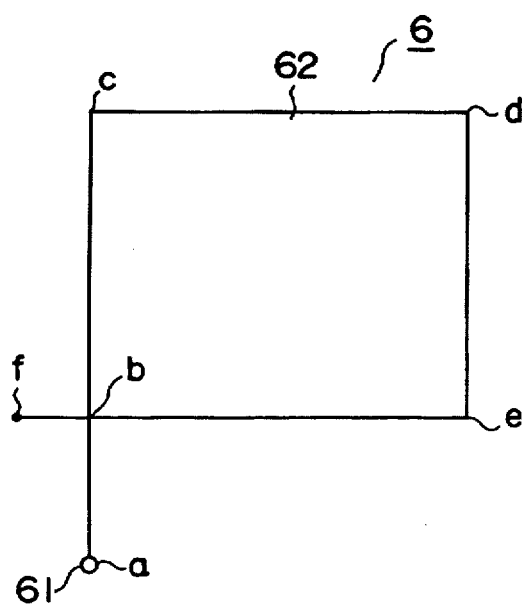
FIG. 4 is an illustration for explaining the typical piercing start in the prior art.

Preferred embodiments of a method and an apparatus for plasma cutting according to the present invention will be described below in detail with reference to the accompanying drawings.

FIG. 2 shows one example of a plasma cutting apparatus embodying the present invention. A plasma torch 4 has an electrode 1 at its center, a nozzle 2 at its outer periphery, and a passage 10 for plasma gas 7 defined between the electrode 1 and the nozzle 2. Merged into the passage 10 are two passages 8 and 9. The passage 8 includes an on-off valve (switching means) 13 and a flow control valve 12, and is connected to a supply source 11 of nitrogen gas, $N_2$. On the other hand, the passage 9 includes an on-off valve (switching means) 16 and a flow control valve 15, and is connected to a supply source 14 of oxygen gas, $O_2$.

Here, the supply source 14 of oxygen gas, $O_2$ and the flow control valve 15 are referred to as the first plasma gas supply means, and the supply source 11 of nitrogen gas, $N_2$, and the flow control valve 12 are referred to as the second plasma gas supply means. These plasma gas supply means are each only required to include at least a supply source of a certain gas. Each of the flow control valves 12 and 15 can be a pressure adjusting valve. Further, the on-off valves 13 and 16 and the flow control valves 12 and 15 can be disposed in the respective passages in an order reversed to that illustrated. Also, each pair of an on-off valve and a flow control valve can be integrated into a one-piece structure. This embodiment employs oxygen gas, $O_2$, as one example of a first plasma gas and nitrogen gas, $N_2$, as one example of a second plasma gas.

The electrode 1 is connected to a negative pole of a power supply 17, while a workpiece 6 is connected to a positive pole of the power supply 17. A current detector 18 is disposed on the positive pole side of the power supply 17. The current detector 18, the flow control valves 12 and 15 and the on-off valves 13 and 16 are connected to a control device 19.

A first embodiment of the plasma cutting method using the above-mentioned apparatus will be described below with reference to FIGS. 1(a) and 1(b). In response to a plasma activating command A outputted from the control device 19, the on-off valve 16 is opened and the opening degree of the flow control valve 15 is adjusted. This allows a small amount of oxygen gas, $O_2$, to flow as the plasma gas 7 into the plasma torch 4 for piercing through the workpiece 6. Then, when a cutting start command B is outputted from the control device 19, the on-off valve 16 is closed to stop the supplying of the oxygen gas, $O_2$ while the on-off valve 13 is opened and the opening degree of the flow control valve 12 is adjusted. This allows a large amount of nitrogen gas, $N_2$, to flow as the plasma gas 7 into the plasma torch 4 for the cutting of the workpiece 6 by the plasma arc 5. The time at which the cutting start command B is outputted can be determined with, e.g., a timer starting clock count from the time at which a current produced upon development of the plasma arc is detected by the current detector 18, or a timer starting clock count from the time at which the plasma activating command A is outputted.

Test data obtained with the first embodiment is shown in FIG. 3. The test was made by using the above apparatus with a current of 300 A and a gas pressure of 6 kg/cm² for each of the oxygen gas, $O_2$, and the nitrogen gas, $N_2$, forming a through-hole with a height of 15 mm in the workpiece 6, made of stainless steel, and measuring the piercing time for each of several steel plates having different thicknesses. In the graph of FIG. 3, the horizontal axis represents a plate thickness [mm] and the vertical axis represents the piercing time [sec]. With the first embodiment, as is apparent from FIG. 3, oxygen gas, $O_2$ requires a piercing time which is shorter than that for the nitrogen gas, $N_2$, when used for the piercing operation. Accordingly, the amount of dross 3 (see FIG. 2) affixed to the plasma torch 4 is reduced. In addition, nitrogen gas, $N_2$, cannot effect the piercing at a plate thickness of more than about 35 mm, but oxygen gas, $O_2$, can effect the piercing even at a plate thickness of more than 40 mm.

The above-described first embodiment can provide the operation and advantages below.

(1) Since a selected, optimum non-oxidative gas is used at the time of the cutting operation, the cut portions of a cut product have less dross, affixed thereto, and clean cut surfaces, and the consumption of the electrode is reduced.

(2) Since an oxidative gas is used at the time of the piercing operation, the heat of oxidation reaction can be utilized and the piercing time is shortened. Further, a reduction in the piercing time reduces the amount of dross which affixes to the plasma torch. It is thus possible to prevent the plasma torch from generating a double arc, and hence to extend the life time of the plasma torch.

(3) Since the piercing operation can be effected for a thicker plate, such a pre-step as forming a through-hole in a workpiece by drilling beforehand can be dispensed with over a wider range of plate thickness.

Next, a second embodiment will be described. In this embodiment, the piercing operation is performed as shown in FIGS. 1(a) and 1(c). More specifically, the control device 19 outputs an operation command B1 a little before the time at which the cutting start command B is outputted. In response to the operation command B1, the on-off valve 13 is opened and the opening degree of the flow control valve 12 is adjusted, allowing nitrogen gas, $N_2$, to flow. In practical control, after the outputting of the plasma activating command A, a timer, set to time out at the time before the outputting of the cutting start command B, triggers the control device 19 to output the operation command B1 to the on-off valve 13 and the flow control valve 12.

Note that the term oxidative gas means an oxygen gas or a gas containing oxygen gas, and the term non-oxidative gas means gas containing at least one of nitrogen gas, argon gas, hydrogen gas, and methane gas.

The operation and advantages below can provided by the above-described second embodiment wherein, when shifting from the piercing operation to the cutting operation, the supplying of the non-oxidative gas is started before the supplying of the oxidative gas is stopped.

(1) Since gas is supplied continuously without a break, the plasma arc is stabilized and steady cutting quality is ensured. The reason is that the gas pressure is varied step by step, rather than abruptly in the case of starting the supplying of the non-oxidative gas and stopping the supplying of the oxidative gas at the same time.

(2) If the electrode is made of a metal, e.g., tungsten, that lowers its melting point when oxidized, a non-oxidative gas acts to prevent oxidation of the electrode to some extent, which contributes to extending the life time of the electrode.

INDUSTRIAL APPLICABILITY

The present invention is usefully practiced as a method and an apparatus for plasma cutting which can produce a cut product having less dross, affixed thereto, and a clear cut surface, which can reduce consumption of an electrode, and which are capable of high-speed performance even at the time of the piercing operation.

We claim:

1. In a method for using a plasma torch for piercing a hole in a workpiece and for cutting the workpiece, said plasma torch having an electrode and a nozzle, said method comprising the steps of:

supplying a plasma gas between the electrode and the nozzle of the plasma torch, and ejecting a plasma arc from the nozzle toward the workpiece while the plasma gas is being supplied between the electrode and the nozzle, in order to effect a piercing operation for piercing a hole in said workpiece and to subsequently effect a cutting operation for cutting the workpiece;

the improvement wherein said step of supplying a plasma gas between the electrode and the nozzle of the plasma torch comprises:

supplying an oxidative gas between the electrode and the nozzle of said plasma torch as said plasma gas at a time of piercing said hole in said workpiece so that the piercing operation is effected with said oxidative gas, and supplying a non-oxidative gas between the electrode and the nozzle of said plasma torch as said plasma gas at a time of cutting the workpiece so that the cutting operation is effected with said non-oxidative gas.

2. A method in accordance with claim 1, wherein the composition of said plasma gas is changed from said oxidative gas to said non-oxidative gas at a time of shifting from a piercing operation to a cutting operation.

3. A method in accordance with claim 2, wherein the composition of said plasma gas is changed during the time of shifting so that variations in pressure of said plasma gas during the time of shifting are suppressed and the plasma arc is stabilized.

4. A method in accordance with claim 2, wherein, when shifting from a piercing operation to a cutting operation, the composition of said plasma gas is changed by starting the supplying of said non-oxidative gas to said plasma torch and then stopping the supplying of said oxidative gas to said plasma torch, so that said plasma gas is continuously supplied to said plasma torch.

5. A method in accordance with claim 4, wherein the composition of said plasma gas is changed during the time of shifting so that variations in pressure of said plasma gas during the time of shifting are suppressed and the plasma arc is stabilized.

6. A method in accordance with claim 5, wherein said oxidative gas comprises oxygen gas, and wherein said non-oxidative gas comprises at least one of nitrogen gas, argon gas, hydrogen gas, and methane gas.

7. A method in accordance with claim 1, wherein said oxidative gas comprises oxygen gas, and wherein said non-oxidative gas comprises at least one of nitrogen gas, argon gas, hydrogen gas, and methane gas.

8. A method in accordance with claim 7, wherein, when shifting from a piercing operation to a cutting operation, the composition of said plasma gas is changed by starting the supplying of said non-oxidative gas between the electrode and the nozzle of said plasma torch and then stopping the supplying of said oxidative gas between the electrode and the nozzle of said plasma torch.

9. A method in accordance with claim 1, wherein, when shifting from a piercing operation to a cutting operation, the supplying of said non-oxidative gas between the electrode and the nozzle of said plasma torch is started and then the supplying of said oxidative gas between the electrode and the nozzle of said plasma torch is stopped.

10. A method in accordance with claim 9, wherein the starting of the supplying of said non-oxidative gas and the stopping of the supplying of said oxidative gas are accomplished so that variations in pressure of said plasma gas are suppressed and the plasma arc is stabilized.

11. In an apparatus comprising:

a plasma torch for piercing a hole in a workpiece and for cutting the workpiece, said plasma torch having an electrode and a nozzle, and a plasma gas supply for supplying plasma gas between said electrode and said nozzle so that said plasma gas is ejected as a plasma arc toward said workpiece in order to effect a piercing operation for piercing a hole in said workpiece and to subsequently effect a cutting operation for cutting the workpiece;

the improvement wherein said plasma gas supply comprises:

a first plasma gas supply for supplying an oxidative gas between said electrode and said nozzle of said plasma torch as said plasma gas, a second plasma gas supply for supplying a non-oxidative gas between said electrode and said nozzle of said plasma torch as said plasma gas, a first valve for connecting/disconnecting said first plasma gas supply to said plasma torch, a second valve for connecting/disconnecting said second plasma gas supply to said plasma torch, and a control device for operating said first and second valves so that said oxidative gas is supplied between said electrode and said nozzle of said plasma torch as said plasma gas at a time of piercing said hole in said workpiece, whereby the piercing operation is effected with said oxidative gas, and so that said non-oxidative gas is supplied between said electrode and said nozzle of said plasma torch as said plasma gas at a time of cutting the workpiece, whereby the cutting operation is effected with said non-oxidative gas.

12. An apparatus in accordance with claim 11, wherein said control device changes the composition of said plasma gas from said oxidative gas to said non-oxidative gas at a time of shifting from a piercing operation to a cutting operation.

13. An apparatus in accordance with claim 12, wherein said control device changes the composition of said plasma gas during the time of shifting so that variations in pressure of said plasma gas during the time of shifting are suppressed and the plasma arc is stabilized.

14. An apparatus in accordance with claim 13, wherein said device controls said first and second valves so that, when shifting from a piercing operation to a cutting operation, said second valve is actuated to start the supplying of said non-oxidative gas before said first valve is actuated to stop the supplying of said oxidative gas so that plasma gas is continuously supplied to said plasma.

15. An apparatus in accordance with claim 11, wherein said control device actuates said first and second valves during a time of shifting from a piercing operation to a cutting operation so that variations in pressure of said plasma gas during the time of shifting are suppressed and the plasma arc is stabilized.

16. An apparatus in accordance with claim 11, wherein said control device controls said first and second valves so that, when shifting from a piercing operation to a cutting operation, said second valve is actuated to start the supplying of said non-oxidative gas between said electrode and said nozzle of said plasma torch before said first valve is actuated to stop the supplying of said oxidative gas between said electrode and said nozzle of said plasma torch so that plasma gas is continuously supplied between said electrode and said nozzle of said plasma torch.

17. An apparatus in accordance with claim 16, wherein said control device actuates said first and second valves during a time of shifting from a piercing operation to a cutting operation so that variations in pressure of said plasma gas during the time of shifting are suppressed and the plasma arc is stabilized.

* * * * *

UNITED STATES PATENT AND TRADEMARK OFFICE
CERTIFICATE OF CORRECTION

PATENT NO. : 5,801,355
DATED : September 1, 1998
INVENTOR(S) : Saio et al.

Page 1 of 1

It is certified that error appears in the above-identified patent and that said Letters Patent is hereby corrected as shown below:

<u>Title page, Item [54] and Column 1, lines 1-3,</u>
In the title of the patent delete "PLASMA PIERCING WITH NON-OXIDATIVE PLASMA GAS AND PLASMA CUTTING WITH OXIDATIVE PLASMA GAS" and insert -- PLASMA PIERCING WITH OXIDATIVE PLASMA GAS AND PLASMA CUTTING WITH NON-OXIDATIVE PLASMA GAS --.

<u>Column 2,</u>
Lines 55-63, delete "FIG. 1 is a time chart for an embodiment of the present invention; that is, (a) shows a plasma activating command common to the first and second embodiments, (b) represents the first embodiment in which; (b1) shows operation of an on-off valve for an oxidative gas and (b2) shows operation of an on-off valve for a non-oxidative gas, and (c) represents the second embodiment in which; (c1) shows operation of an on-off valve for an oxidative gas and (c2) shows operation of an on-off valve for a non-oxidative gas." and insert -- FIGS. 1(a), 1(b), and 1(c) are time charts for an embodiment of the present invention; that is, FIG. 1(a) shows a plasma activating command common to the first and second embodiments, FIG. 1(b) represents the first embodiment in which the heavy line designated (b1) shows operation of an on-off valve for an non-oxidative gas, and the heavy line designated (b2) shows operation of an on-off valve for a non-oxidative gas, and FIG. 1(c) represents the second embodiment in which the heavy line designated (c1) shows operation of an on-off valve for an oxidative gas and the heavy line designated (c2) shows operation of an on-off valve for a non-oxidative gas. --

Signed and Sealed this

Twenty-third Day of April, 2002

Attest:

Attesting Officer

JAMES E. ROGAN
*Director of the United States Patent and Trademark Office*

UNITED STATES PATENT AND TRADEMARK OFFICE
CERTIFICATE OF CORRECTION

PATENT NO.    : 5,801,355    Page 1 of 1
DATED         : September 1, 1998
INVENTOR(S)   : Saio et al.

It is certified that error appears in the above-identified patent and that said Letters Patent is hereby corrected as shown below:

Title page, Item [54] and Column 1, lines 1-3,
In the title of the patent delete "PLASMA PIERCING WITH NON-OXIDATIVE PLASMA GAS AND PLASMA CUTTING WITH OXIDATIVE PLASMA GAS" and insert -- PLASMA PIERCING WITH OXIDATIVE PLASMA GAS AND PLASMA CUTTING WITH NON-OXIDATIVE PLASMA GAS --.

Column 2,
Lines 55-63, delete "FIG. 1 is a time chart for an embodiment of the present invention; that is, (a) shows a plasma activating command common to the first and second embodiments, (b) represents the first embodiment in which; (b1) shows operation of an on-off valve for an oxidative gas and (b2) shows operation of an on-off valve for a non-oxidative gas, and (c) represents the second embodiment in which; (c1) shows operation of an on-off valve for an oxidative gas and (c2) shows operation of an on-off valve for a non-oxidative gas." and insert -- FIGS. 1(a), 1(b), and 1(c) are time charts for an embodiment of the present invention; that is, FIG. 1(a) shows a plasma activating command common to the first and second embodiments, FIG. 1(b) represents the first embodiment in which the heavy line designated (b1) shows operation of an on-off valve for an oxidative gas and the heavy line designated (b2) shows operation of an on-off valve for a non-oxidative gas, and FIG. 1(c) represents the second embodiment in which the heavy line designated (c1) shows operation of an on-off valve for an oxidative gas and the heavy line designated (c2) shows operation of an on-off valve for a non-oxidative gas. --

This certificate supersedes Certificate of Correction issued April 23, 2002

Signed and Sealed this

Twentieth Day of August, 2002

Attest:

JAMES E. ROGAN
Attesting Officer      Director of the United States Patent and Trademark Office